United States Patent [19]
Takahashi et al.

[11] 3,905,862
[45] Sept. 16, 1975

[54] CAULKING APPARATUS

[75] Inventors: Naoki Takahashi; Yukinori Taneda, both of Yokohama; Takashi Kobayashi, Fujisawa, all of Japan

[73] Assignee: Hitachi, Ltd., Japan

[22] Filed: Oct. 15, 1974

[21] Appl. No.: 514,959

[30] Foreign Application Priority Data
Oct. 17, 1973 Japan............................ 48-115765

[52] U.S. Cl. .................... 156/580; 228/1; 228/110
[51] Int. Cl.² ..................... B29C 27/08; B23K 1/06
[58] Field of Search ....... 156/380, 580, 73.1; 228/1, 228/110; 29/470.3

[56] References Cited
UNITED STATES PATENTS
3,647,599  3/1972  Gardner.......................... 156/580
3,841,947  10/1974  Bocquet et al.................. 156/580

*Primary Examiner*—Douglas J. Drummond
*Attorney, Agent, or Firm*—Craig & Antonelli

[57] ABSTRACT

An apparatus comprising a jig on which are placed, through the agency of guide pins, a member for caulking made of a thermoplastic resinous material and formed therein with bores and a member to be caulked also made of a thermoplastic resinous material and formed thereon with projections for caulking, the first-mentioned member being superposed on the last-mentioned member with the projections for caulking each being received in one of the bores. The apparatus also comprises a vertically movable pressure receiving plate adapted to be moved downwardly toward the member for caulking, and a plurality of pressers adapted to move upwardly the member to be caulked. The downwardly moving pressure receiving plate moves the guide pins downwardly to release them from engagement with the member to be caulked, while the member to be caulked moved upwardly by the plurality of pressers is moved away from the upper surface of the jig and pressure is applied by the pressers to the associated projections for caulking. Then pressure waves of ultrasonic frequency are transmitted through a caulking tool to the upper end of each projection for caulking so as to ultrasonically treat the projections for caulking to thereby caulk the edges of the projections for caulking and the member for caulking.

1 Claim, 5 Drawing Figures

CAULKING APPARATUS

BACKGROUND OF THE INVENTION

This invention relates to a caulking apparatus utilizing pressure waves of ultrasonic frequency and adapted for use with a thermoplastic resinous material.

In caulking apparatus of the prior art for carrying out caulking by shaping as desired a member to be caulked made of a thermoplastic resinous material and having a plurality of caulked spots by utilizing pressure waves of ultrasonic frequency, the usual practice is to superpose a member for caulking which is formed therein with bores on a member to be caulked which is formed with projections for caulking adapted to be received in the respective bores formed in the member for caulking, and to place an assembly of these two members on a jig by guiding them by guide pins extending upwardly from the upper surface of the jig. Pressure is applied to the assembly of two members from above by a pressure applying plate formed therein with openings through which a caulking tool is successively brought into contact with the projections for caulking to transmit pressure waves of ultrasonic frequency to the projections for caulking so as to induce generation of heat inside the projection whereby the projections can be treated ultrasonically to caulk the edges of the projections and the bores formed in the member for caulking.

Some disadvantages are associated with the aforementioned type of caulking apparatus. When there is a variation in the dimensions of the member to be caulked and the member for caulking, difficulty would be experienced in applying pressure uniformly to all the areas surrounding the plurality of projections for caulking. This would give rise to a variation in the pressure applied to the plurality of projections for caulking, and would cause a variation to occur in the bonding force with which the edges of the members are caulked after caulking is carried out. Thus some of the caulked edges of the members would lack a bonding force of the desired level of intensity.

Pressure is applied to the assembly of the member for caulking and the member to be caulked through the former which is superposed on the latter. After caulking is effected, the member for caulking is made to conform to the shape of the member to be caulked, so that height of the member for caulking would vary from one portion to another. Moreover, since the member to be caulked is held in place by means of the guide pins, the pressure waves of ultrasonic frequency applied to the projections for caulking would be transferred through the member to be caulked and heat would be generated in portions of the member surrounding the guide pins, thereby melting more material than is necessary.

SUMMARY OF THE INVENTION

A principal object of the invention is to provide a caulking apparatus in which a variation in the bonding force at work in the caulked spots and a variation in the height of the member for caulking from one portion to another after caulking is effected can be minimized.

Another object of the invention is to provide a caulking apparatus adapted for use with a thermoplastic resinous material which utilizes pressure waves of ultrasonic frequency and avoids melting of more material than is necessary in carrying out caulking.

According to the invention, the aforementioned objects are accomplished as follows. There is provided a pressure receiving plate which, being disposed on the side of the member for caulking formed with bores for receiving therein respective projections for caulking extending upwardly from the member to be caulked, is adapted to move downwardly in operation. There are also provided a plurality of pressers each disposed under a portion of the underside of the member to be caulked which corresponds to a portion of the upper surface thereof at which one of the projections for caulking is disposed. The pressers upwardly move the respective projections for caulking to compress the member to be caulked and the member for caulking between the pressure receiving plate and the pressers, so as to thereby upwardly move the member to be caulked away from the upper surface of the jig. Caulking is carried out by applying pressure waves of ultrasonic frequency to each projection for caulking while maintaining the pressure applied to all the caulked spots constant. Another feature of the invention is that the guide pins disposed in holes formed in the jig are constructed such that they are forced to move into the holes by the pressure receiving plate when the latter moves downwardly, so that the member to be caulked can be released from engagement with the guide pins when caulking is carried out ultrasonically.

Additional and other objects and advantages of the invention will become apparent after the ensuing description is considered in conjunction with the accompanying drawings.

DESCRIPTION OF A PREFERRED EMBODIMENT

Figure 1:
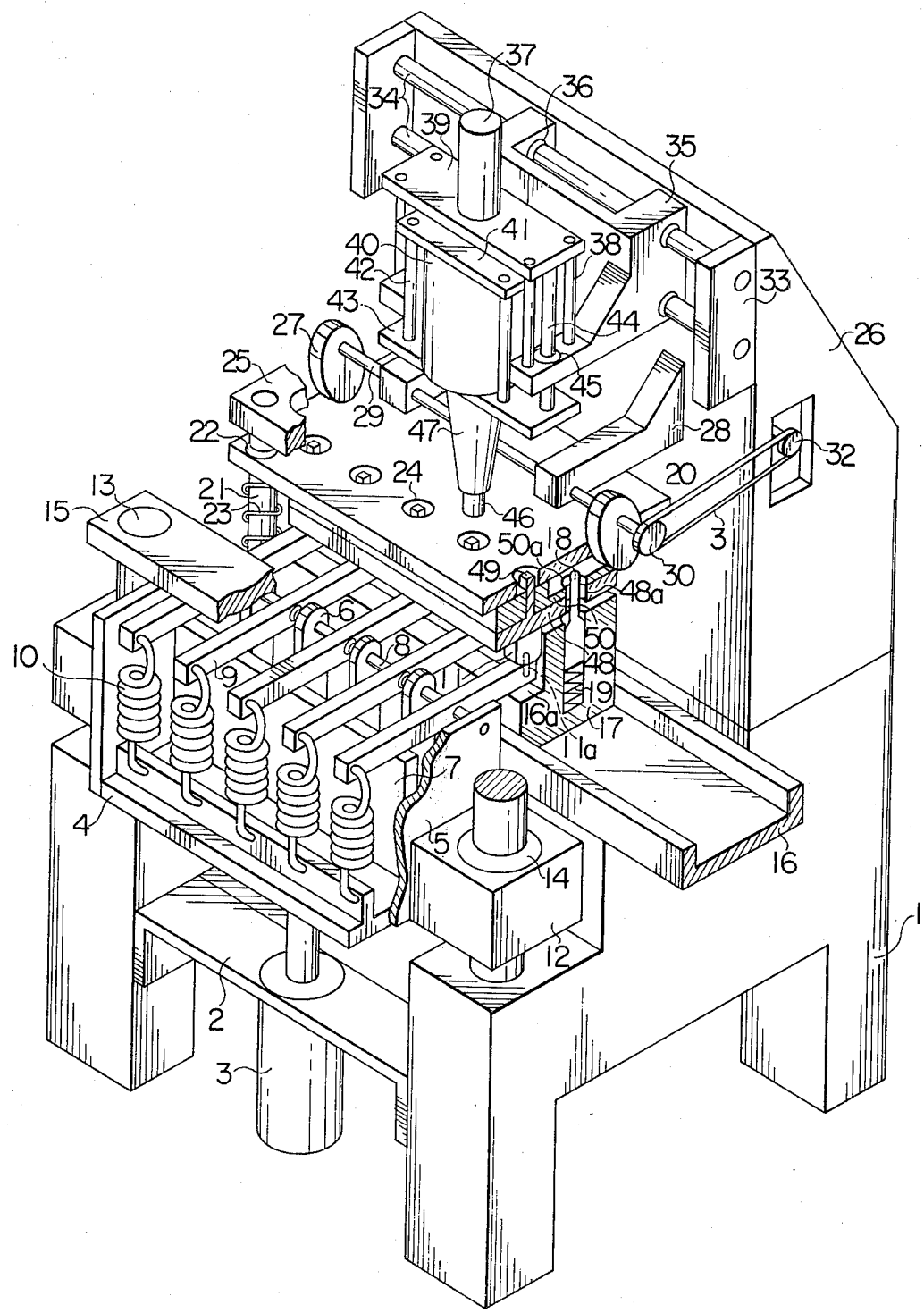
FIG. 1 is a perspective view, partly shown in section, of the caulking apparatus according to the invention.

FIG. 1 to FIG. 5 show a preferred embodiment of the invention in which 17 is a jig formed therein with holes each receiving therein a vertically slidable guide pin 18 normally urged by the biasing force of a spring 19 to move to an upper position in which the upper portion of the guide pin extends upwardly from the upper surface of the jig 17. A member to be caulked 48 and a member for caulking 50 superposed on the member 48 to form an assembly are placed on the upper surface of the jig 17 in a position such that the guide pins 18 extending upwardly from the upper surface of the jig 17 are received in openings 48a and 50a formed in the members 48 and 50 respectively. The jig 17 is disposed on a rail 16 mounted on a bed 1 and adapted to move horizontally therealong.

20 designates a pressure receiving plate formed therein with a plurality of apertures 24 through which a caulking operation is performed which are disposed in positions corresponding to those of projections for caulking 49 extending upwardly from the surface of the member to be caulked 48. The pressure receiving plate 20 is supported, through linear motion bearings 22, by vertical shafts 21 affixed to the bed 1 and normally urged to move upwardly along the shafts 21 by the biasing force of springs 23. The upward movement of the pressure receiving plate 20 is limited by a stopper 25 affixed to the upper end of each shaft 21.

The jig 17 is formed with a cutout 16a, so that when the member to be caulked 48 and the member for caulking 50 are placed on the jig 17, a portion of the underside of the member to be caulked 48 which corresponds to a portion of the upper surface thereof at which each projection for caulking 49 is disposed is kept from coming into contact with the upper surface of the jig 17. The pressers 11 which are independent of one another are disposed in the cutout 16a in positions which correspond to the positions of the associated projections for caulking 49.

Each presser 11 is planar on its upper surface and curved on the underside and pivotally supported at one end of a pressure applying bar 9 through a pin 11a affixed to the curved underside of the presser 11. The pressure applying bars 9, which are pivotally supported substantially at the center by a pin 8 supported by side plates 5 and supports 6, are each connected at the other end to a bottom plate 4 through a spring 10. A stopper 7 is provided to keep the other end of each pressure applying bar 9 from coming into contact with the bottom plate 4.

The bottom plate 4 is secured to a piston rod of a hydraulic cylinder 3 and has mounted thereon the side plates 5, supports 6 and stopper 7. The hydraulic cylinder 3 is supported by a mounting plate 2 which is affixed to the bed 1. As the piston rod of the hydraulic cylinder 3 moves upwardly and downwardly, the bottom plate 4 can also move upwardly and downwardly in sliding motion along guide bars 13, since guides 12 secured to the side plates 5 are maintained in engagement, through linear motion bearings 14, with the guide bars 13 mounted on the bed 1. The upward movement of the bottom plate 4 is limited by a stopper 15 supported by the guide bars 13 at their upper ends.

26 refers to a fixed base which is affixed to the surface of the bed 1. 27 designates cams which are affixed to a cam shaft 29 rotatably supported by arms 28 supported in turn by the fixed base 26. The cam shaft 29 is rotated as rotation of a motor (not shown) mounted on the rear side of the fixed base 26 is transmitted thereto through a belt 31 trained over a pulley 30 secured to one end of the cam shaft 29 and a pulley 32 secured to one end of a shaft of the motor.

33 refers to support plates affixed to the fixed base 26 and supporting guide rails 34. 35 is a movable base which slidably engages the guide rails 34 through linear motion bearings 36, the direction of its sliding motion being parallel to the direction in which the projections for caulking 49 are arranged in a row. 37 is a pneumatic cylinder mounted on a mounting plate 39 supported by support posts 38 affixed to the movable base 35. 40 is a vibrator interposed between an upper plate 41 affixed to a spindle of the pneumatic cylinder 37 and a lower plate 43 supported by the upper plate 41 through support posts 42. 44 refers to guide bars affixed at one end to the lower plate 43 slidably engaging the movable base 35 through linear motion bearings 45 for guiding the vertical movement of the movable base 35. 46 is a caulking tool connected to a horn 47 which in turn is connected to the vibrator 40.

Figure 2:
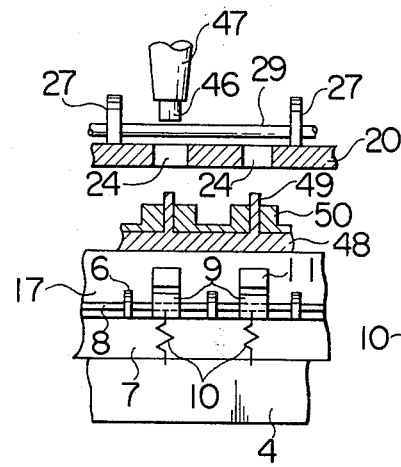
FIG. 2 is a front view, partly shown in section, of essential portions of the caulking apparatus shown in FIG. 1, showing the apparatus in a state in which pressure is not applied yet.
Figure 3:
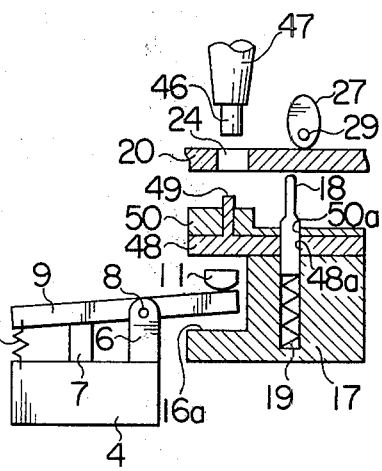
FIG. 3 is a side view of the essential portions of the apparatus shown in FIG. 2.

In the aforementioned construction, the jig 17 is moved to a right end of the rail 16, the member to be caulked 48 is placed on the jig 17 through the agency of the guide pins 18, and the member for caulking 50 is placed on the member to be caulked 48 through the agency of the guide pins 18, with the projections for caulking 49 being received in the respective bores formed in the member for caulking 50. As shown in FIG. 2 and FIG. 3, the guide pins 18 each include a minor diameter upper portion and a major diameter lower portion. The guide pins 18 are normally urged by the biasing force of springs 19 to move upwardly such that the major diameter lower portion of each guide pin 18 extends upwardly from the upper surface of the jig 17 and is engaged in one of the openings 48a and 50a formed in the members 48 and 50 respectively without becoming wobbly, thereby positioning the two members 48 and 50.

Then the jig 17 is moved leftwardly along the rail 16 to a predetermined position in which the jig 17 is disposed beneath the pressure receiving plate 20 and the projections for caulking 49 are indexed with the respective apertures formed in the pressure receiving plate 20 as shown in FIG. 2 and FIG. 3. With the jig 17 in this position, the pulley 32 is rotated by the motor disposed on the rear side of the fixed base 26 so as to cause the pulley 30 to make one-half a revolution through the belt 31. This results in the pressure receiving plate 20 being pressed by the cams 27 and moving downwardly against the biasing force of springs 23 to a position in which the plate 20 is spaced apart a small distance from the upper surface of the member for caulking 50. The downward movement of the pressure receiving plate 20 presses the guide pins 18 and moves the same downwardly deep into the holes formed in the jig 17 against the biasing force of springs 19, so that the major diameter lower portions of the guide pins 18 are released from engagement in the openings 48a and 50a, thereby releasing the members 48 and 50 from engagement with the guide pins 18.

The cylinder 3 is actuated to move the bottom plate 4 upwardly. As a result, the pressers 11 upwardly move the member to be caulked 48 so as to force the member for caulking 50 tightly against the pressure receiving plate 20. Further upward movement of the bottom plate 4 causes the pressure applying bars 9 to move in pivotal motion about the pin 8 against the biasing force of springs 10, so that the pressure applying bars 9 are released from engagement with the stopper 7. The pressers 11 also move in pivotal motion at one end of the pressure applying bars 9 into positions in which they press the underside of the member to be caulked 48 while remaining parallel to the pressure receiving plate 20 at all times.

Figure 4:
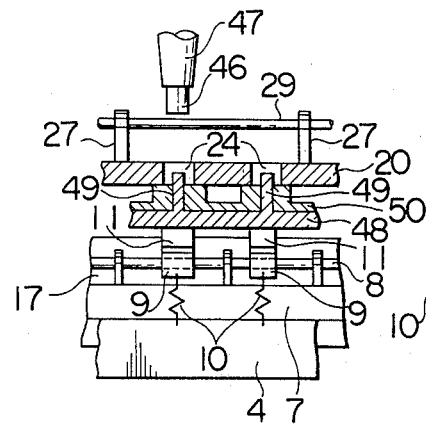
FIG. 4 is a front view, partly shown in section, of essential portions of the caulking apparatus shown in FIG. 1, showing the apparatus in a state in which pressure is applied.
Figure 5:
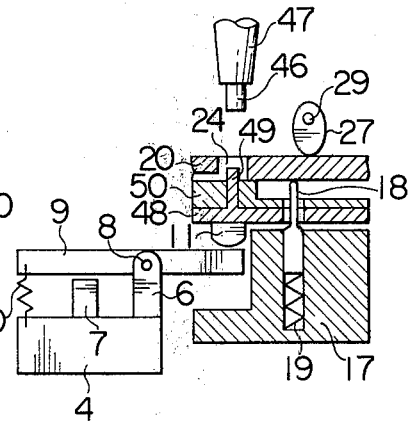
FIG. 5 is a side view of the essential portions of the apparatus shown in FIG. 4.

Upon the pressure applying bars 9 being released from engagement with the stopper 7, a force consistent with the tensile strength of each spring 10 is exerted on the associated presser 11. At the same time, the projections 49 extending from the member to be caulked 48 are each pressed with a force which is consistent with the tensile strength of the associated spring 10. Thus, if the springs 10 all have tensile strength of the same intensity, it will be possible to apply pressure of the same intensity to all the projections 49. FIG. 4 and FIG. 5 show the parts in this state.

The vibrator 40 is caused to vibrate in ultrasonic frequency, and the pneumatic cylinder 37 is actuated while pressure waves of ultrasonic frequency are being transmitted through the horn 47 to the caulking tool 46, so that the caulking tool 46 is brought into pressing engagement with one of the projections for caulking 49 through the associated aperture 24 formed in the pressure receiving plate 20. The pressure waves of ultrasonic frequency are transmitted from the caulking tool 46 to the projection for caulking 49, so that the projection 49 is ultrasonically treated and caulks the edges of the projection 49 and the member for caulking 50.

When all the projections 49 have been subjected to ultrasonic treatment to effect caulking, the pneumatic cylinder 37 is actuated to withdraw the bonding tool 46 and the vibrator 40 is rendered inoperative. Then the hydraulic cylinder 3 is actuated to move the bottom plate 4 downwardly. This causes the pressure applying bars 9 to move in pivotal motion about the pin 8 into engagement with the stopper 7, thereby releasing the pressure on the member to be caulked 48. At this time, the member to be caulked 48 moves downwardly into engagement with the upper surface of the jig 17, thereby forming a small gap between the member for caulking 50 and the pressure receiving plate 20. Then the motor disposed on the rear side of the fixed base 26 is actuated to cause the cams 27 to make one-half a revolution. This permits the pressure receiving plate 20 to be moved upwardly by the biasing force of springs 23 until it is brought into engagement with the stopper 25 and becomes stationary. Finally the jig 17 is returned to the right end of the rail 16 to remove the assembly that has been caulked ultrasonically.

As the means for rotating the pulley 32, either a pulse motor or a combination of an ordinary motor and a one revolution stop clutch may be used. The means for vertically moving the pressure receiving plate 20 in sliding motion may be in the form of a hydraulic cylinder or a combination of a hydraulic or pneumatic cylinder and a cam, in place of using the cams 27 as described hereinabove. A cam mechanism may be employed as the pressure applying means for moving the pressers 11 upwardly and downwardly, in place of the hydraulic cylinder 3. The springs 10 may be replaced by hard rubber such as polyurethane which may be attached to the bottom plate 4 for supporting the pressers 11 thereon. In placing the member to be caulked 48 in a predetermined position on the jig 17, the guide pins 18 may be dispensed with, if the member to be caulked 48 is guided in accordance with its external shape.

From the foregoing description, it will be appreciated that according to the invention the member to be caulked 48 and the member for caulking 50 superposed one on the other are moved upwardly by applying pressure to the underside of the member to be caulked 48 by means of the pressers 11 which are each disposed in a position corresponding to a position in which one of the projections for caulking 49 is disposed. Thus every portion of the assembly of the members 48 and 50 can be made to press, with a uniform force, against the pressure receiving plate 20 disposed above the member 50. When ultrasonic treatment is performed, the guide pins 18 are released from engagement with the member to be caulked 48 and the member for caulking 50, thereby enabling to keep more material than is necessary from being melted.

In the embodiment shown and described hereinabove, the number and position of the pressers 11 are fixed. However, it is to be understood that they can be varied according to the number and position of the projections for caulking 49, and that the pressure applying springs may be replaced by cylinders which can be adjusted individually.

What is claimed is:

1. A caulking apparatus comprising:
   a. a jig including a supporting surface and formed with a cutout, said jig being provided with a plurality of guide pins mounted in holes formed in the jig and each being urged by a resilient member to extend upwardly from said supporting surface, said supporting surface being adapted to receive thereon a member to be caulked and a member for caulking, said member to be caulked having a plurality of projections for caulking and said member for caulking being formed with a plurality of openings, said two members being arranged relative to each other such that the member for caulking is superposed on the member to be caulked with the projections for caulking being received in the respective openings, said projections for caulking being disposed above said cutout;
   b. a pressure receiving plate arranged in juxtaposed relation with said supporting surface of said jig provided with the guide pins and spaced therefrom a predetermined distance, said pressure receiving plate being formed with a plurality of apertures each disposed in a position corresponding to a position in which one of said projections for caulking is disposed;
   c. means for moving said pressure receiving plate in sliding motion toward said supporting surface of said jig;
   d. a plurality of pressers each dispsoed in a position corresponding to a position in which one of said projections for caulking of said member to be caulked is disposed, said member to be caulked being positioned in face-to-face relation with said pressure receiving plate and disposed above said cutout formed in said jig;
   e. means for applying pressure to cause all the pressers to move in the direction of said pressure receiving plate until the pressers each reach a position in which it is disposed above said supporting surface of said jig;
   f. a plurality of resilient members each associated with one of said plurality of pressers and interposed between each of said pressers and said pressure applying means; and
   g. a ultrasonic generator mechanism adapted to be brought into engagement with each of said projections for caulking of said member to be caulked extending through one of said plurality of apertures formed in said pressure receiving plate so as to transmit pressure waves of ultrasonic frequency to each said projection whereby said projections for caulking can be treated ultrasonically to caulk the edges of the member for caulking and the projections for caulking.

* * * * *